US007979808B2

(12) United States Patent
Stiso (10) Patent No.: US 7,979,808 B2
(45) Date of Patent: Jul. 12, 2011

(54) NAVIGATIONAL TOOLS FOR LARGE TREES (75) Inventor: Michael Stiso, San Francisco, CA (US)

(73) Assignee: Oracle International Corporation, Redwood Shores, CA (US)

(*) Notice: Subject to any disclaimer, the term of this patent is extended or adjusted under 35 U.S.C. 154(b) by 747 days.

(21) Appl. No.: 11/844,937

(22) Filed: Aug. 24, 2007

(65) Prior Publication Data
US 2009/0055762 A1 Feb. 26, 2009

(51) Int. Cl.
G06F 3/00 (2006.01)
G06F 3/04 (2006.01)
G06F 7/00 (2006.01)
H04L 12/56 (2006.01)

(52) U.S. Cl. ........... 715/853; 715/754; 707/E17.011; 707/E17.012; 707/999.001; 707/797; 707/956; 370/408

(58) Field of Classification Search ........... 707/E17.011, 707/E17.012, 999.001, 797, 956, E17.037; 370/408; 715/853, 854
See application file for complete search history.

(56) References Cited

U.S. PATENT DOCUMENTS

| 5,913,063 | A  | * | 6/1999 | McGurrin et al. | 717/109 |
|-----------|-----|---|--------|-----------------|---------|
| 6,278,464 | B1 | * | 8/2001 | Kohavi et al.   | 345/440 |
| 6,366,906 | B1 | * | 4/2002 | Hoffman         | 1/1     |
| 6,750,864 | B1 | * | 6/2004 | Anwar           | 345/440 |
| 6,850,255 | B2 | * | 2/2005 | Muschetto       | 715/788 |
| 7,069,547 | B2 | * | 6/2006 | Glaser          | 717/154 |
| 7,168,050 | B1 | * | 1/2007 | Kwon et al.     | 715/843 |
| 7,197,517 | B2 | * | 3/2007 | Farrington et al. | 707/797 |
| 7,596,757 | B2 | * | 9/2009 | Kowalski et al. | 715/763 |
| 2002/0101418 | A1 | * | 8/2002 | Vernier et al. | 345/418 |
| 2003/0084425 | A1 | * | 5/2003 | Glaser         | 717/110 |
| 2004/0169688 | A1 | * | 9/2004 | Burdick et al. | 345/854 |
| 2005/0050438 | A1 | * | 3/2005 | Cheung et al.  | 715/500 |
| 2006/0164997 | A1 | * | 7/2006 | Graepel et al. | 370/241 |
| 2006/0167863 | A1 | * | 7/2006 | Cole et al.    | 707/3   |
| 2006/0242121 | A1 | * | 10/2006 | DeVorchik et al. | 707/3 |
| 2007/0180404 | A1 | * | 8/2007 | Gandolph et al. | 715/825 |
| 2009/0177665 | A1 | * | 7/2009 | Callery et al. | 707/100 |
| 2010/0169832 | A1 | * | 7/2010 | Chang          | 715/811 |
| 2010/0268828 | A1 | * | 10/2010 | Pahlavan et al. | 709/227 |
| 2010/0281374 | A1 | * | 11/2010 | Schulz et al.  | 715/723 |

* cited by examiner

*Primary Examiner* — Boris Pesin
*Assistant Examiner* — Ece Hur
(74) *Attorney, Agent, or Firm* — Kilpatrick Townsend & Stockton LLP (57) ABSTRACT

This disclosure describes, generally, tools for navigation of tree structures. For example, a software application comprising a user interface for allowing a user to navigate a tree structure is described. The user interface comprises a graphical element including the tree structure. The tree structure comprises multiple nodes which represent a hierarchical view of data within the structure. One of the nodes is set as the active node. The computer software application also includes a storage element to store a list of previous active nodes. The graphical element is in conjunction with a first navigational element configured to step backward through the list of previous active nodes, and to set the stepped to node as the active node. The graphical element is further in conjunction with a second navigational element configured to step forward through the list of previous active nodes, and to set the stepped to node as the active node.

21 Claims, 5 Drawing Sheets

NAVIGATIONAL TOOLS FOR LARGE TREES

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD OF THE INVENTION

The present invention relates, in general, to computer software, and more particularly to graphical tools for allowing a user to navigate a graphical user interface.

BACKGROUND OF THE INVENTION

Tree data structures are a common way to represent hierarchical information in software application such as, file folders, database relations, software code class trees, system registries, etc. Such tree structures facilitate access to information by organizing the information in a logical manner. However, as the information being represented becomes larger and more complex, the tree structures grow to include more nodes and a greater number of levels in the hierarchy. Consequently, these larger tree structures become increasingly difficult for users to navigate, and very few innovations in managing these tree data structures have been made.

Specifically, larger trees include more information for a user to search through. In addition, the information that the user is looking for may be deep within the hierarchy of the tree. As such, if a user is not already aware of where to find the information they are searching for, the user may be required to follow potentially long branches. Even if the user does happen to know where the information they are looking for is located, the user may still be required to browse through several nodes in order to get to their desired location.

Furthermore, navigation in large trees becomes even more difficult when a tree includes many levels of sub-nodes. This is due to the fact that exploring those levels requires the user to scroll both horizontally and vertically in order to fit a new level within a window's viewing area. As the user scrolls down more and more levels, the user must remember their position within the tree. Remembering tree positions in large trees becomes increasingly difficult. This problem is compounded when a user employs a find or search option. Following a search the user has virtually no way to orient themselves within the tree structure.

Consequently, as a user searches through a tree structure, the user may easily become disoriented, and have difficulty returning to their starting location. Further, as a user navigates through the tree structure they may lose track of previously selected nodes. For these reasons, among others, there is a need for improvements to navigational tools in a hierarchical tree data structure.

BRIEF SUMMARY OF THE INVENTION

Embodiments of the invention provide graphical user interface tools and navigational elements to allow a user to more efficiently and effectively navigate tree data structures. In a set of embodiments, for example, a software application might include a user interface that has a graphical element (such as a navigational button, a slider, and/or the like) that allows a user to navigate the tree structure. The software application may further include popup boxes to display pertinent navigational information to the user. In an aspect of the invention, the user may be allowed to select an active node within the tree structure and then navigate backward and forward through previously selected active nodes.

Various sets of embodiments provide user interfaces, methods, systems, and software products. Certain methods of the invention might implement user interfaces of the invention, might be implemented as software programs and/or might be implemented as instructions to be performed by a computer system. Similarly, systems of the invention can include computers configured with software (e.g. sets of instructions) executable to perform methods of the invention and/or to implement user interfaces of the invention.

An exemplary set of embodiments, for example, provides a computer software application comprising a user interface for allowing a user to navigate a tree structure. The user interface, in some embodiments, comprises a graphical element which includes the tree structure. The tree structure may comprise multiple nodes which represent a hierarchical view of data within the tree structure. In one embodiment, one of the nodes is set as the active node (i.e. the node which the user may currently be focused on). The computer software application may also include a storage element to store a list of previous active nodes.

The graphical element is in conjunction with a first navigational element that is configured to step backward through the list of previous active nodes, and also to set the stepped to node as the active node. The graphical element is further in conjunction with a second navigational element that is configured to step forward through the list of previous active nodes, and also to set the stepped to node as the active node.

An exemplary method of graphically presenting information to a user, in accordance with another set of embodiments, might comprise displaying on a display device a graphical element representing a hierarchical view of data within a tree structure. The tree structure may include multiple nodes. The method, in some embodiments, may set one of the nodes as an active node, and store a list of previous active nodes.

In certain embodiments, the method might further comprise displaying on the display device a first navigational element that is configured to step backward through the list of previous active nodes and to set the stepped to node as the active node. In a further embodiment, the method may display on the display device a second navigational element that is configured to step forward through the list of previous active nodes and to set the stepped to node as the active node.

Another set of embodiments provides systems. An exemplary system might comprise a processor, a display device, and a computer readable medium comprising a set of instructions executable by the processor. The set of instructions might comprise instructions to perform methods of the invention. Similarly, a computer program embodied on a computer readable medium might comprise a set of instructions executable by one or more computers to perform methods of the invention.

Another exemplary computer system might comprise a database having a plurality of records, each of which might comprise a data element that corresponds to a field in the database, and/or a software application. The software application might comprise a set of instructions executable by the computer system.

The set of instructions might comprise, inter alia, instructions to display a user interface. The user interface, in a set of embodiments, comprises a graphical element which includes the tree structure. The tree structure may comprise multiple nodes which represent a hierarchical view of data within the tree structure. In one embodiment, one of the nodes is set as the active node. The computer software application may also include a storage element to store a list of previous active nodes.

In some embodiments, the set of instructions further comprises instructions to display, on the display device, a first navigational element that is configured to step backward through the list of previous active nodes and also to set the stepped to node as the active node. The set of instructions further comprise instructions to display, on the display device, a second navigational element that is configured to step forward through the list of previous active nodes, and also to set the stepped to node as the active node.

Hence, embodiments of the invention overcome a variety of shortcomings of previous solutions, including without limitation those described above, as well as others that will become apparent to one of skill in the art upon review of this disclosure.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sublabel is associated with a reference numeral to denote one of multiple similar components. When reference is made to a reference numeral without specification to an existing sublabel, it is intended to refer to all such multiple similar components.

In the appended figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION OF THE INVENTION

While various aspects of embodiments of the invention have been summarized above, the following detailed description illustrates exemplary embodiments in further detail to enable one of skill in the art to practice the invention. In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form. Several embodiments of the invention are described below, and while various features are ascribed to different embodiments, it should be appreciated that the features described with respect to one embodiment may be incorporated with another embodiment as well. By the same token, however, no single feature or features of any described embodiment should be considered essential to the invention, as other embodiments of the invention may omit such features.

Aspects of the present invention involve navigating through hierarchical tree data structures displayed in a graphical user interface. Certain embodiments are especially advantageous in navigating tree structures which are sufficiently large (i.e. deeply embedded nodes, numerous nodes, etc.) to make traditional navigation tools ineffective or inefficient. When navigating through such tree structures it is important for users to be able to easily return to their starting point within the tree as well as keep track of locations they have visited within the tree.

Further aspects of the invention may include an enterprise application for navigating the tree data structures. A user may access the enterprise application to search nodes of the tree structure, in which the nodes may be located across a network (e.g. a local area network (LAN), a wide area network (WAN), the Internet, etc). The enterprise application may present the data to the user in an organized fashion to facilitate searching and navigation of the nodes within the tree structure.

Figure 1:
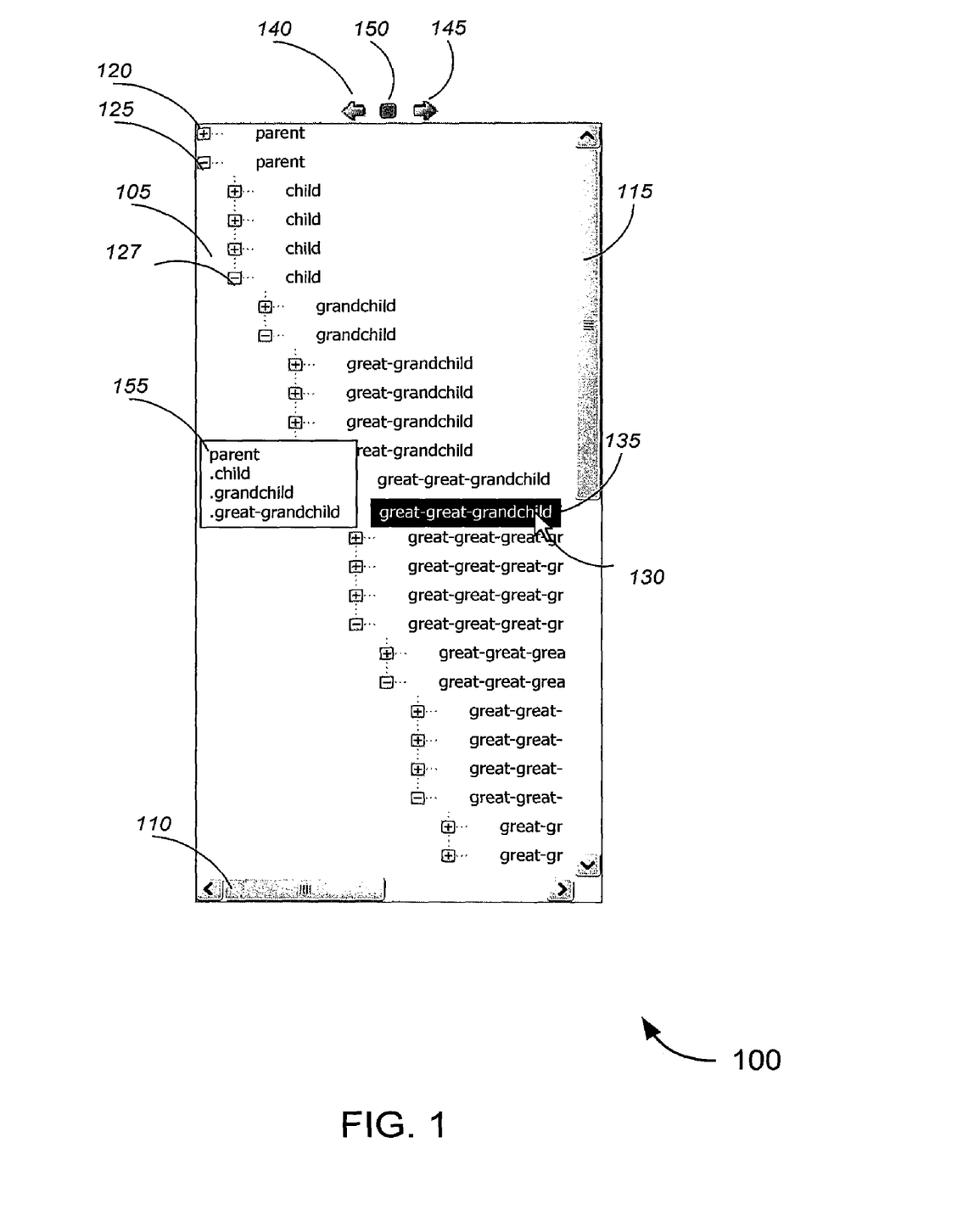
FIGS. 1, 2A, and 2B depict user interfaces for displaying and navigating tree data structures, in accordance with various embodiments of the invention.

FIG. 1 illustrates a graphical element 100 (e.g. window, pane, frame, etc.) for displaying and navigating tree data structures, in accordance with various embodiments of the invention. Graphical element 100 may include a background 105, horizontal slider 110 and vertical slider 115. Vertical and horizontal sliders 110 and 115 may be used by a user to manipulate the current viewing area of graphical element 100. For example, the user may want to view items off the screen to the left or right of the current position of graphical element 100, as such the user would move horizontal slider 110 accordingly. Similarly, if the user wants to view items above or below the current position of graphical element 100, the user can move vertical slider 115.

Graphical element 100 may further include collapsible elements 120 and 125. Collapsible elements 120 and 125 may be used to represent connection points for node relationships within the tree data structure. For example, collapsible element 125 connects a parent node to four child nodes, and collapsible element 127 connects one of the child nodes to two grandchild nodes, and so forth. Further, these collapsible elements may be expanded or collapsed to show relatively more or less information to the user.

In one embodiment, manipulation of elements within graphical element 100 is done by pointer 130. Pointer 130 allows a user to select nodes within the tree structure, expand or collapse the collapsible elements, scroll vertical and horizontal sliders 110 and 115, etc.

According to one embodiment, an active node 135 is selected. The active node may be designated as active node by a highlighting scheme, as with active node 135; however, other designations may be used (e.g. blocking around the text of the active node, italicizing the text of the active node, etc.). In one embodiment, whenever an active node is selected the previous active node is stored in an active node history table. This table may store all of the previous active nodes in the order the nodes were visited. In an alternative embodiment, the previous active nodes may be stored by hierarchical value (i.e. the highest nodes in the tree structure placed first in the list) or they may be stored based on a relevancy value associated with each node. Nonetheless, the table may be traversed to cycle through previously active nodes.

In a further embodiment, graphical element 100 may include navigation buttons 140 and 145. Navigational buttons 140 and 145 may function to traverse through the active node history table backward and forward, respectively. For example, if the active node history table includes node 120, node 125, node 127 and active node 135 in that order, then when navigational button 140 is pressed the active node would be set to node 127. If navigational button 140 is pressed again, then the active node would be set to node 125.

Similarly, if node 125 is the active node and navigational button 145 is pressed, the active node would then be set to node 127. Further, if navigational button 145 is pressed again then the active node would be set to node 135. This process may be repeated to effectively allow a user to cycle through the active node history table. Furthermore, as additional active nodes are selected, those nodes may be added to the active node history table, and may also be accessed via navigational buttons 140 and 145.

In one embodiment, each time navigational button 140 or 145 is pressed and a new active node is set, the active node is centered vertically and horizontally within graphical element 100. In a further embodiment, the active node history table may be displayed in a menu (e.g. a drop-down menu, scroll menu, etc.). The user is then able to select a specific previous active node without needing to cycle through each node in the list.

In accordance with a further embodiment of the invention, graphical element 100 may include navigational button 150. While searching through the tree data structure a user may scroll through the tree without selecting a new active node. In some instances the user may have searched deep into the tree and may have difficulty finding their way back to the active node. Alternatively, the user may want to be able to search the tree and have the ability to quickly return to the active node. Accordingly, navigational button 150 may be used to center the active node within graphical element 100 from any location within the tree. For example, if the user has scrolled a number of pages down from the active node, the user may press navigational button 150 and be returned to the active node.

Graphical element 100 may further include information box 155. Often, when a user is searching a tree data structure, it may be useful for the user to know the hierarchy (i.e. the ancestry) of a given node. Hierarchal data may represent interconnections between nodes within the tree structure. In one embodiment, hovering pointer 130 over a node may display that node's hierarchy in information box 155. Information box 155 may appear after pointer 130 has hovered over a node for a predetermined increment of time (e.g., 3 seconds); however, other time increments may be used.

Figure 2A:
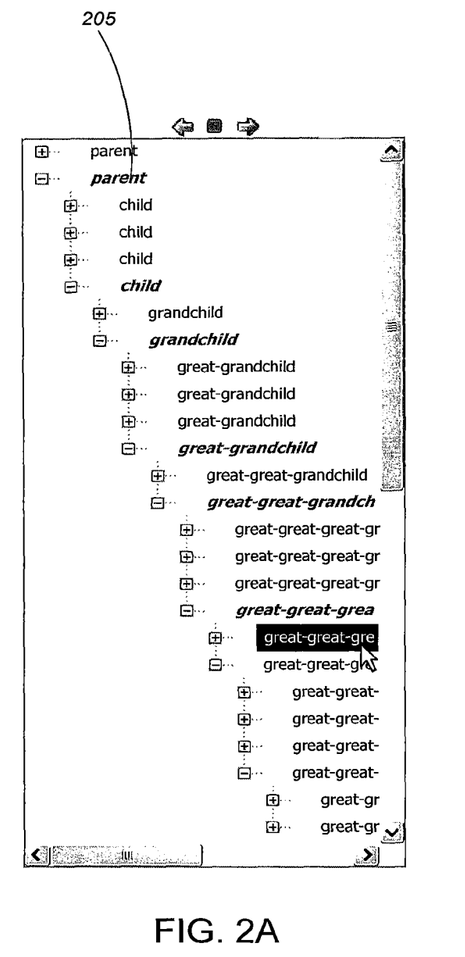
Figure 2B:
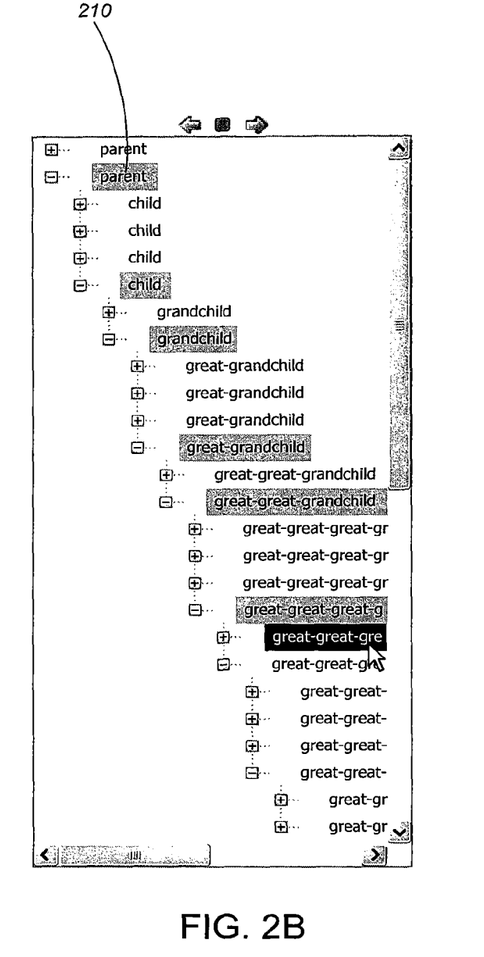

Certain embodiments facilitate navigation of tree data structures. Merely by way of example, FIGS. 2A and 2B show examples of highlighting schemes for highlighting previous active nodes. For example, a user may navigate through the tree structure selecting a number of nodes as active node. Each instance a new active node is selected, the text of the previous active node is altered in some way to indicate to the user that the node has previously been selected as active node. Consequently, a trail (or history) of previously selected active nodes is created allowing the user to retrace their navigational steps through the tree structure.

In one embodiment, the color and/or font of the text of a previously active node may be altered (e.g. previously active node 205). Specifically, the color of previously active node 205 has been changed from black to gray and the font has been italicized. Alternatively, the font may be bolded, underlined, etc., and any number of colors may be used. Specifically, any of the font size, font weight or font type of the a node's text may be changed in order to designate that the node has previously been the active node.

In another embodiment, the text of previously active nodes may be highlighted (e.g. previously active node 210). The highlighting may be any number of colors and/or shapes. FIG. 2B illustrates the text of previously active node 210 highlighted with a gray square; however, other shapes and/or colors may be used.

Figure 3:
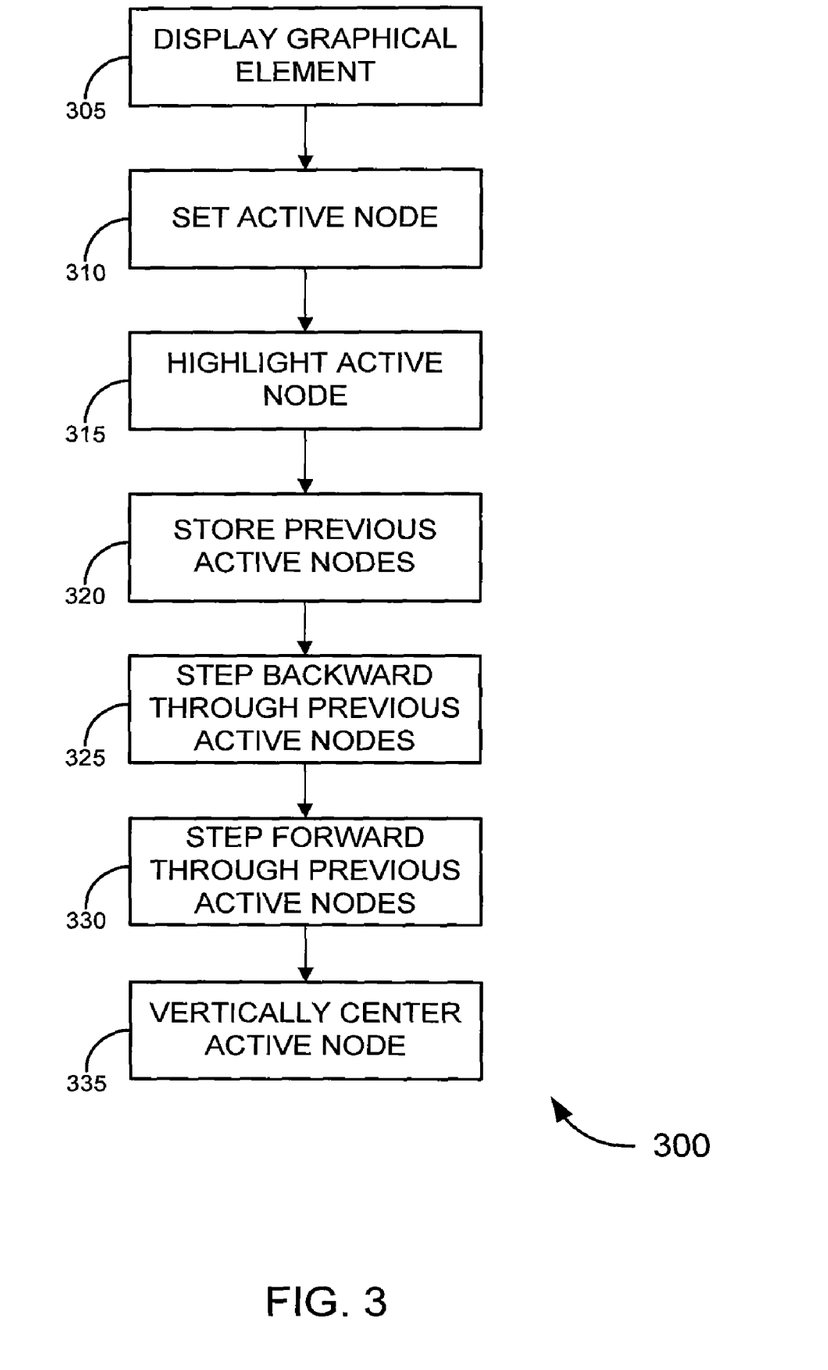
FIG. 3 is a process flow diagram illustrating a method of navigating a tree data structure, in accordance with various embodiments of the invention.

Turning now to FIG. 3 which illustrates a method 300 that utilizes a graphical element (such as graphical element 100) to navigate through a tree data structure. In one embodiment, the method comprises displaying (e.g., on a display device, as part of a user interface) a graphical element that represents nodes within a tree data structure (block 305).

It should be appreciated that the graphical element 100 might be implemented in a variety of ways. Merely by way of example, graphical element 100 might be implemented as a web-based application, and the user interface, accordingly, might be configured to provide interaction via a set of web pages (e.g., pages served by a web server, which might be integrated with, and/or separate from graphical element 100). In other embodiments, graphical element 100 might be configured to operate in a client-server configuration, or as a standalone application on a user computer (perhaps with facilities for communicating with application 445 and/or database 520*a* or 520*b*). Hence, the user interface might be configured to generate display screens (e.g., using tools provided by the operating system of the computer on which graphical element 100 runs on) for interaction with the user. One skilled in the art should appreciate, based on this disclosure, that there are many mechanisms for presenting a user interface to a user, and any of such mechanisms may be used in accordance with different embodiments of the invention.

In some embodiments, the method further comprises setting any one of the nodes within the tree structure as an active node (block 310). The active node may be highlighted or otherwise graphically indicated (block 315). The active node may be active node 130 from FIG. 1, in accordance with one embodiment (although is should be appreciated that other embodiments might set the active node in a different manner).

At block 320, as a new active node is selected, a reference to previously selected active nodes are stored in a data structure (e.g. a table, a linked list, etc.). The data structure may then be accessed to allow a user to step backwards through previous active nodes (block 325). Each step through the list of previous active nodes sets one of the previous active nodes as the current active node, which allows the user to cycle backward through previously visited nodes.

At block 330, the data structure is accessed to allow the user to step forward through the list of previously active nodes. This allows the user to cycle forward through nodes that have been previously visited. Merely by way of example, the navigational buttons 140 and 145, as described above, might be user interface elements capable of receiving user input. These elements may be connected to graphical element 100 and may be used to cycle forward and backward through the list of previous active nodes.

At block 335, the user may center the user interface on the current active node. In one embodiment, the user presses navigational button 150, described above, to center on the current active node. This allows the user to quickly and effectively return to the current active node even if the active node is located many screens from the currently viewable section of the user interface.

Figure 4:
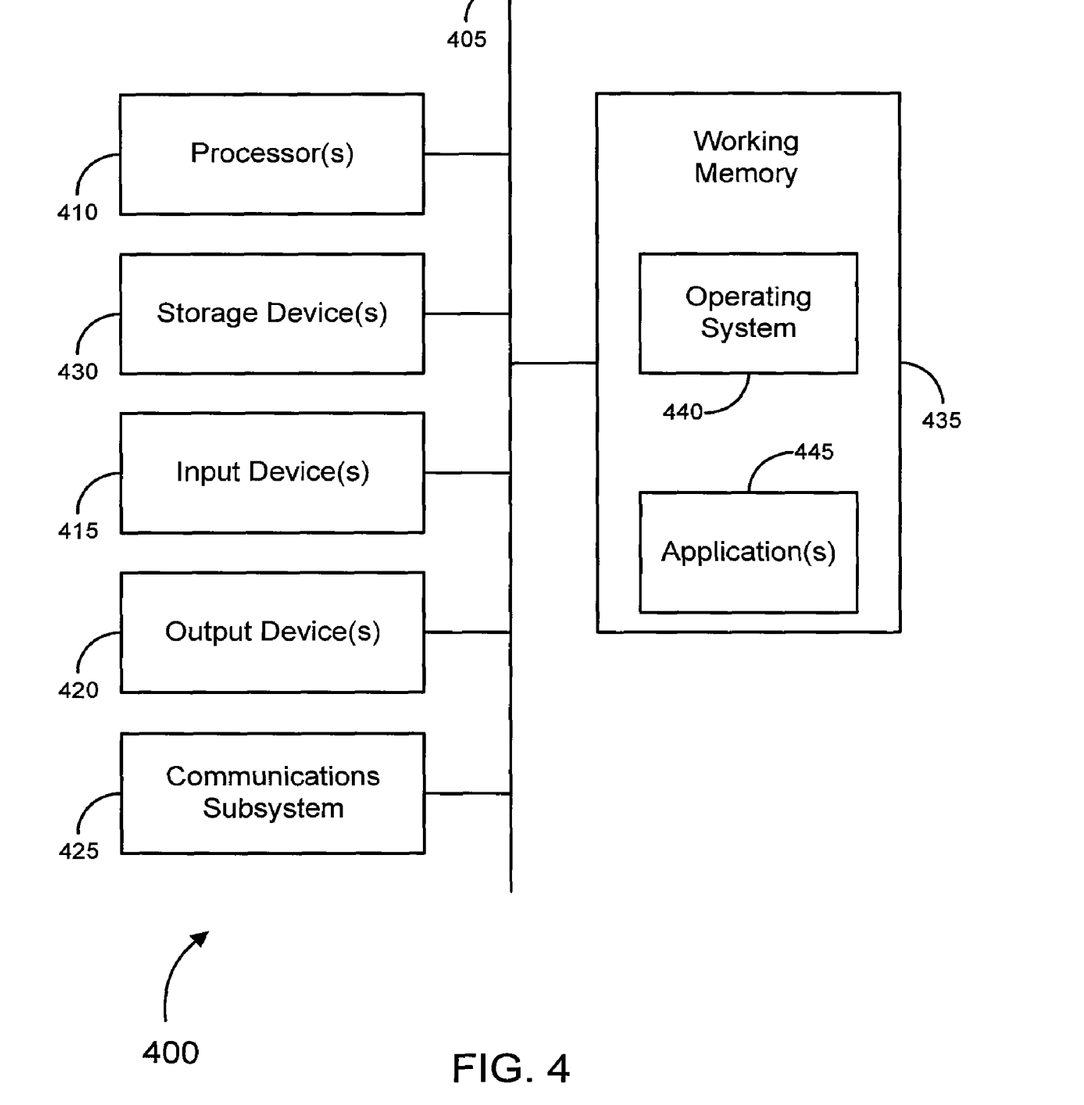
FIG. 4 is a generalized schematic diagram illustrating a computer system, in accordance with various embodiments of the invention.

FIG. 4 provides a schematic illustration of one embodiment of a computer system 400 that can perform the methods of the invention, as described herein. It should be noted that FIG. 4 is meant only to provide a generalized illustration of various components, any or all of which may be utilized as appropriate. FIG. 4, therefore, broadly illustrates how individual system elements may be implemented in a relatively separated or relatively more integrated manner.

The computer system 400 is shown comprising hardware elements that can be electrically coupled via a bus 405 (or may otherwise be in communication, as appropriate). The hardware elements can include one or more processors 410, including without limitation one or more general-purpose processors and/or one or more special-purpose processors (such as digital signal processing chips, graphics acceleration chips, and/or the like); one or more input devices 415, which can include without limitation a mouse, a keyboard and/or the like; and one or more output devices 420, which can include without limitation a display device, a printer and/or the like.

The computer system 400 may further include (and/or be in communication with) one or more storage devices 425, which can comprise, without limitation, local and/or network accessible storage and/or can include, without limitation, a disk drive, a drive array, an optical storage device, solid-state storage device such as a random access memory ("RAM") and/or a read-only memory ("ROM"), which can be programmable, flash-updateable and/or the like. The computer system 400 might also include a communications subsystem 430, which can include without limitation a modem, a network card (wireless or wired), an infrared communication device, a wireless communication device and/or chipset (such as a Bluetooth™ device, an 802.11 device, a WiFi device, a WiMax device, cellular communication facilities, etc.), and/or the like. The communications subsystem 430 may permit data to be exchanged with a network (such as the network described below, to name one example), and/or any other devices described herein. In many embodiments, the computer system 400 will further comprise a working memory 435, which can include a RAM or ROM device, as described above.

The computer system 400 also can comprise software elements, shown as being currently located within the working memory 435, including an operating system 440 and/or other code, such as one or more application programs 445, which may comprise computer programs of the invention, and/or may be designed to implement methods of the invention and/or configure systems of the invention, as described herein. Merely by way of example, one or more procedures described with respect to the method(s) discussed above might be implemented as code and/or instructions executable by a computer (and/or a processor within a computer). A set of these instructions and/or code might be stored on a computer readable storage medium, such as the storage device(s) 425 described above. In some cases, the storage medium might be incorporated within a computer system, such as the system 400. In other embodiments, the storage medium might be separate from a computer system (i.e., a removable medium, such as a compact disc, etc.), and or provided in an installation package, such that the storage medium can be used to program a general purpose computer with the instructions/code stored thereon. These instructions might take the form of executable code, which is executable by the computer system 400 and/or might take the form of source and/or installable code, which, upon compilation and/or installation on the computer system 400 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

In one aspect, the invention employs a computer system (such as the computer system 400) to perform methods of the invention. According to a set of embodiments, some or all of the procedures of such methods are performed by the computer system 400 in response to processor 410 executing one or more sequences of one or more instructions (which might be incorporated into the operating system 440 and/or other code, such as an application program 445) contained in the working memory 435. Such instructions may be read into the working memory 435 from another machine-readable medium, such as one or more of the storage device(s) 425. Merely by way of example, execution of the sequences of instructions contained in the working memory 435 might cause the processor(s) 410 to perform one or more procedures of the methods described herein.

The terms "machine readable medium" and "computer readable medium," as used herein, refer to any medium that participates in providing data that causes a machine to operate in a specific fashion. In an embodiment implemented using the computer system 400, various machine-readable media might be involved in providing instructions/code to processor(s) 410 for execution and/or might be used to store and/or carry such instructions/code. In many implementations, a computer readable medium is a physical and/or tangible storage medium. Such a medium may take many forms, including but not limited to, non-volatile media, volatile media, and transmission media. Non-volatile media includes, for example, optical or magnetic disks, such as the storage device(s) 425. Volatile media includes, without limitation dynamic memory, such as the working memory 435. Transmission media includes coaxial cables, copper wire and fiber optics, including the wires that comprise the bus 405, as well as the various components of the communication subsystem 430 (and/or the media by which the communications subsystem 430 provides communication with other devices). Hence, transmission media can also take the form of waves (including without limitation radio, acoustic and/or light waves, such as those generated during radio-wave and infrared data communications).

Common forms of physical and/or tangible computer readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, a carrier wave as described hereinafter, or any other medium from which a computer can read instructions and/or code.

Various forms of machine-readable media may be involved in carrying one or more sequences of one or more instructions to the processor(s) 410 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 400. These signals, which might be in the form of electromagnetic signals, acoustic signals, optical signals and/or the like, are all examples of carrier waves on which instructions can be encoded, in accordance with various embodiments of the invention.

The communications subsystem 430 (and/or components thereof) generally will receive the signals, and the bus 405 then might carry the signals (and/or the data, instructions, etc., carried by the signals) to the working memory 435, from which the processor(s) 405 retrieves and executes the instructions. The instructions received by the working memory 435 may optionally be stored on a storage device 425 either before or after execution by the processor(s) 410.

Figure 5:
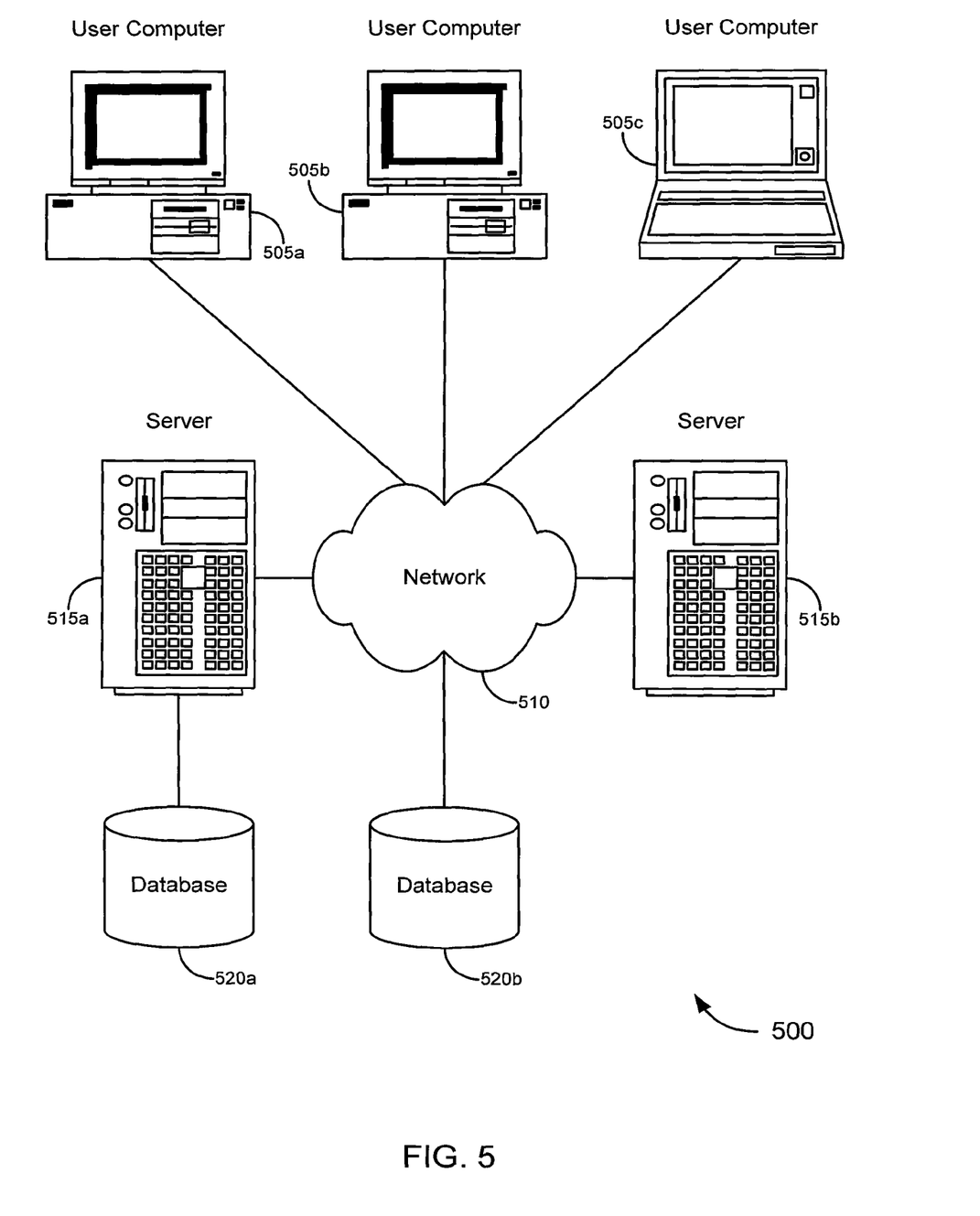
FIG. 5 is a block diagram illustrating a networked system of computers, which can be used in accordance with various embodiments of the invention.

A set of embodiments comprises systems for navigation of tree data structures. Merely by way of example, FIG. 5 illustrates a schematic diagram of a system 500 that can be used in accordance with one set of embodiments. The system 500 can include one or more user computers 505. The user computers 505 can be general purpose personal computers (including, merely by way of example, personal computers and/or laptop computers running any appropriate flavor of Microsoft Corp.'s Windows™ and/or Apple Corp.'s Macintosh™ operating systems) and/or workstation computers running any of a variety of commercially-available UNIX™ or UNIX-like operating systems. These user computers 505 can also have any of a variety of applications, including one or more applications configured to perform methods of the invention, as well as one or more office applications, database client and/or server applications, and web browser applications. Alternatively, the user computers 505 can be any other electronic device, such as a thin-client computer, Internet-enabled mobile telephone, and/or personal digital assistant, capable of communicating via a network (e.g. the network 510 described below) and/or displaying and navigating web pages or other types of electronic documents. Although the exemplary system 500 is shown with three user computers 505, any number of user computers can be supported.

Certain embodiments of the invention operate in a networked environment, which can include a network 510. The network 510 can be any type of network familiar to those skilled in the art that can support data communications using any of a variety of commercially-available protocols, including without limitation TCP/IP, SNA, IPX, AppleTalk™, and the like. Merely by way of example, the network 510 can be a local area network ("LAN"), including without limitation an Ethernet™ network, a Token-Ring™ network and/or the like; a wide-area network; a virtual network, including without limitation a virtual private network ("VPN"); the Internet; an intranet; an extranet; a public switched telephone network ("PSTN"); an infrared network; a wireless network, including without limitation a network operating under any of the IEEE 802.11 suite of protocols, the Bluetooth™ protocol known in the art, and/or any other wireless protocol; and/or any combination of these and/or other networks.

Embodiments of the invention can include one or more server computers 515. Each of the server computers 515 may be configured with an operating system, including without limitation any of those discussed above, as well as any commercially (or freely) available server operating systems. Each of the servers 515 may also be running one or more applications, which can be configured to provide services to one or more clients 505 and/or other servers 515.

Merely by way of example, one of the servers 515 may be a web server, which can be used to process requests for web pages or other electronic documents from user computers 505. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 505 to perform methods of the invention.

The server computers 515, in some embodiments, might include one or more file and/or application servers, which can include one or more applications accessible by a client running on one or more of the client computers 505 and/or other servers 515. Merely by way of example, the server(s) 515 can be one or more general purpose computers capable of executing programs or scripts in response to the user computers 505 and/or other servers 515, including without limitation web applications (which might, in some cases, be configured to perform methods of the invention). Merely by way of example, a web application can be implemented as one or more scripts or programs written in any suitable programming language, such as Java™, C, C#™ or C++, and/or any scripting language, such as Perl, Python, or TCL, as well as combinations of any programming/scripting languages. The application server(s) can also include database servers, including without limitation those commercially available from Oracle, Microsoft, Sybase™, IBM™ and the like, which can process requests from clients (including, depending on the configuration, database clients, API clients, web browsers, etc.) running on a user computer 505 and/or another server 515. In some embodiments, an application server can create web pages dynamically for displaying the information in accordance with embodiments of the invention, such as graphical element 100 and the like. Data provided by an application server may be formatted as web pages (comprising HTML, Javascript, etc., for example) and/or may be forwarded to a user computer 505 via a web server (as described above, for example). Similarly, a web server might receive web page requests and/or input data from a user computer 505 and/or forward the web page requests and/or input data to an application server. In some cases a web server may be integrated with an application server.

In accordance with further embodiments, one or more servers 515 can function as a file server and/or can include one or more of the files (e.g., application code, data files, etc.) necessary to implement methods of the invention incorporated by an application running on a user computer 505 and/or another server 515. Alternatively, as those skilled in the art will appreciate, a file server can include all necessary files, allowing such an application to be invoked remotely by a user computer 505 and/or server 515. It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 520. The location of the database(s) 520 is discretionary: merely by way of example, a database 520a might reside on a storage medium local to (and/or resident in) a server 515a (and/or a user computer 505). Alternatively, a database 520b can be remote from any or all of the computers 505, 515, so long as it can be in communication (e.g., via the network 510) with one or more of these. In a particular set of embodiments, a database 520 can reside in a storage-area network ("SAN") familiar to those skilled in the art. (Likewise, any necessary files for performing the functions attributed to the computers 505, 515 can be stored locally on the respective computer and/or remotely, as appropriate.) In one set of embodiments, the database 535 can be a relational database, such as an Oracle database, that is adapted to store, update, and retrieve data in response to SQL-formatted commands. The database might be controlled and/or maintained by a database server, as described above, for example.

While the invention has been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods of the invention are not limited to any particular structural and/or functional architecture but instead can be implemented on any suitable hardware, firmware and/or software configuration. Similarly, while various functionality is ascribed to certain system components, unless the context dictates otherwise, this functionality can be distributed among various other system components in accordance with different embodiments of the invention.

Moreover, while the procedures comprised in the methods and processes described herein are described in a particular order for ease of description, unless the context dictates otherwise, various procedures may be reordered, added, and/or omitted in accordance with various embodiments of the invention. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary features, the various components and/or features described herein with respect to a particular embodiment can be substituted, added and/or subtracted from among other described embodiments, unless the context dictates otherwise. Consequently, although the invention has been described with respect to exemplary embodiments, it will be appreciated that the invention is intended to cover all modifications and equivalents within the scope of the following claims.

What is claimed is:

1. A non-transitory computer readable storage medium having encoded thereon a computer program for defining, in an enterprise application including a user interface for navigating a tree data structure of collapsible elements, the computer program comprising a set of instructions executable by a computer system to perform one or more operations, the set of instructions comprising:
    instructions for displaying a window configured for displaying the tree structure, wherein the tree structure comprises a plurality of nodes which represent a hierarchical view of data within the collapsible elements of the tree structure;
    instructions for selecting at least one node in the plurality of nodes; instructions for receiving input at a displayed first button to set the selected at least one of the plurality of nodes as an active node, wherein each node in the plurality of nodes is represented by a textual name and when a node is selected as the active node the textual name is highlighted;
    instructions for storing a list of previous active nodes on a memory device;
    instructions for displaying a second button in conjunction with the window, the f-ws~ second button configured to step backward through the list of previous active nodes to allow the user to select a node, wherein the selected node is set as the active node;
    instructions for displaying a third button in conjunction with the window, the third button configured to step forward through the list of previous active nodes to allow the user to select a node, wherein the selected node is set as the active node, wherein after a new active node is selected the previous active node's textual name remains highlighted; and
    instructions for displaying a fourth button in conjunction with the window, the fourth button configured to vertically and horizontally center the active node within the window.

2. The non-transitory computer readable storage medium of claim 1, wherein the enterprise application comprises the computer program.

3. A non-transitory computer-readable storage medium having encoded thereon a software application comprising a set of instructions executable by a computer system configured to display, for a user, a user interface for allowing a user to navigate a tree structure of collapsible elements, the user interface comprising:
    a graphical element configured for displaying the collapsible elements of the tree structure, wherein the tree structure comprises a plurality of nodes which represent a hierarchical view of data within the tree structure, wherein at least one node in the plurality of nodes is set as an active node;
    a storage element to store a list of previous active nodes; a displayed first button configured to set at least one of the plurality of nodes as the active node, wherein the at least one of the plurality of nodes in selected at the time the first button is toggled, wherein each node in the plurality of nodes is represented by a textual name and when a node is selected as the active node the textual name is highlighted;
    a first navigational element in conjunction with the graphical element, the first navigational element configured to step backward through the list of previous active nodes to allow the user to select a node, wherein the selected node is set as the active node; and
    a second navigational element in conjunction with the graphical element, the second navigational element configured to step forward through the list of previous active nodes to allow the user to select a node, wherein the selected node is set as the active node, wherein after a new active node is selected the previous active node's textual name remains highlighted; and
    a second button configured to vertically and horizontally center the active node within the window.

4. A non-transitory computer-readable storage medium as recited by claim 3, wherein the user interface further comprises:
    a third navigational element in conjunction with the graphical element, the third navigational element configured to vertically and horizontally center the active node within the graphical element.

5. A non-transitory computer-readable storage medium as recited by claim 4, wherein the user interface further comprises:
    a horizontal slider in conjunction with the graphical element, the horizontal slider configured to move the tree structure within the graphical element in a horizontal direction to view nodes located out of the graphical element's horizontal viewing area; and a vertical slider in conjunction with the graphical element, the vertical slider configured to move the tree structure within the graphical element in a vertical direction to view nodes located out of the graphical element's vertical viewing area.

6. A non-transitory computer-readable storage medium as recited by claim 5, wherein the user interface is configured to allow the user to provide a set of inputs to interact with at least one element selected from the group consisting of: the first navigational element, the second navigational element, the third navigational element, the horizontal slider, and the vertical slider.

7. A non-transitory computer-readable storage medium as recited by claim 6, wherein the set of inputs comprises at least one input from a pointing device.

8. A non-transitory computer-readable storage medium as recited by claim 7, wherein the user interface further comprises:
an information box to display hierarchical data of a node when the pointing device is hovered over the node.

9. A non-transitory computer-readable storage medium as recited by claim 8, wherein the information box is displayed after the pointing device has hovered over the node for a predetermined amount of time.

10. A non-transitory computer-readable storage medium as recited by claim 3, wherein the list of previous active nodes is ordered sequentially in accordance with the hierarchy of the collapsible elements.

11. A non-transitory computer-readable storage medium as recited by claim 3, wherein the highlighting comprises changing at least one of the textual name's font type, font color, font weight, and font size.

12. A non-transitory computer-readable storage medium as recited by claim 3, wherein the graphical user interface further comprises:
a plurality of collapsible elements, wherein each of the plurality of nodes is associated with one of the plurality of collapsible elements, wherein each of the collapsible elements is configured to expand and collapse hierarchal connections between the plurality of nodes.

13. A non-transitory computer-readable storage medium as recited by claim 3, wherein the tree structure is at least one of a directory structure, a system registry, a file folder system, and a database relationship structure.

14. A non-transitory computer-readable storage medium as recited in claim 3, further comprising a web server configured to transmit one or more webs page for display in a web browser operated by the user, the one or more web pages comprising the user interface.

15. A method of graphically presenting information to a user, the method comprising: displaying on a display device a graphical element representing a hierarchical view of data within a tree structure of collapsible elements, wherein the tree structure comprises a plurality of nodes;
selecting at least one node in the plurality of nodes; setting, using a displayed first button, the selected at least one of the plurality of nodes as an active node, wherein each node in the plurality of nodes is represented by a textual name and when a node is selected as the active node the textual name is highlighted;
storing a list of previous active nodes; displaying on the display device a first navigational element configured to step backward through the list of previous active nodes to allow the user to select a node, wherein the selected node is set as the active node;
displaying on the display device a second navigational element configured to step forward through the list of previous active nodes to allow the user to select a node, wherein the selected node is set as the active node, wherein after a new active node is selected the previous active node's textual name remains highlighted; and
displaying a second button configured to vertically and horizontally center the active node within a graphical window.

16. A method as recited by claim 15, further comprising:
displaying on the display device a third navigational element configured to vertically and horizontally center the active node within the graphical element.

17. A method as recited by claim 15, further comprising:
displaying on the display device an information box including hierarchical data of a node when a pointing device is hovered over the node.

18. A method as recited by claim 17, wherein the hierarchical data includes information indicating other nodes in the plurality of nodes interconnected with the node.

19. A system, comprising: a processor; a display device; and a non-transitory computer readable medium comprising a set of instructions executable by the processor, the set of instructions comprising:
instructions to display, on the display device, a graphical element representing a hierarchical view of data within a tree structure of collapsible elements, wherein the tree structure comprises a plurality of nodes;
instructions to select at least one node in the plurality of nodes; instructions to set, using a displayed first button, the selected at least one of the plurality of nodes as an active node, wherein each node in the plurality of nodes is represented by a textual name and when a node is selected as the active node the textual name is highlighted; instructions to store a list of previous active nodes; instructions to display, on the display device, a first navigational element configured to step backward through the list of previous active nodes to allow the user to select a node, wherein the selected node is set as the active node;
instructions to display, on the display device, a second navigational element configured to step forward through the list of previous active nodes to allow the user to select a node, wherein the selected node is set as the active node, wherein after a new active node is selected the previous active node's textual name remains highlighted; and instructions to display a second button configured to vertically and horizontally center the active node within a graphical window.

20. A system as recited by claim 19, wherein the sets of instructions further comprise:
instructions to display, on the display device, a third navigational element configured to vertically and horizontally center the active node within the graphical element.

21. A system for graphically presenting information to a user, the system comprising:
means for displaying, on the display device, a graphical element representing a hierarchical view of data within a tree structure of collapsible elements, wherein the tree structure comprises a plurality of nodes;
means for selecting at least one node in the plurality of nodes;
means for setting, using a displayed first button, the selected at least one of the plurality of nodes as an active node;
means for storing a list of previous active nodes; means for displaying, on the display device, a first navigational element configured to step backward through the list of previous active nodes to allow the user to select a node, wherein the selected node is set as the active node;
means for displaying, on the display device, a second navigational element configured to step forward through the list of previous active nodes to allow the user to select a node, wherein the selected node is set as the active node, wherein after a new active node is selected the previous active node's textual name remains highlighted; and
means for displaying a second button configured to vertically and horizontally center the active node within a graphical window.

* * * * *

UNITED STATES PATENT AND TRADEMARK OFFICE
CERTIFICATE OF CORRECTION

PATENT NO. : 7,979,808 B2  Page 1 of 1
APPLICATION NO. : 11/844937
DATED : July 12, 2011
INVENTOR(S) : Stiso It is certified that error appears in the above-identified patent and that said Letters Patent is hereby corrected as shown below:

In column 5, line 67, delete "the a" and insert -- the --, therefor.

In column 6, line 37, delete "is" and insert -- it --, therefor.

In column 11, line 53, in Claim 1, before "second" delete "f-ws~".

In column 12, line 19, in Claim 3, delete "in" and insert -- is --, therefor.

In column 13, line 32, in Claim 14, delete "webs page" and insert -- web pages --, therefor.

Signed and Sealed this
Twenty-second Day of November, 2011

David J. Kappos
*Director of the United States Patent and Trademark Office*